US008838455B1

(12) United States Patent  (10) Patent No.: US 8,838,455 B1
Fox  (45) Date of Patent: Sep. 16, 2014

(54) VOICEXML BROWSER AND SUPPORTING COMPONENTS FOR MOBILE DEVICES

(75) Inventor: Chad Daniel Fox, Omaha, NE (US)

(73) Assignee: West Corporation, Omaha, NE (US)

( * ) Notice: Subject to any disclaimer, the term of this patent is extended or adjusted under 35 U.S.C. 154(b) by 1610 days.

(21) Appl. No.: 12/138,479

(22) Filed: Jun. 13, 2008

(51) Int. Cl.
*G10L 15/00* (2013.01)
*G10L 21/00* (2013.01)

(52) U.S. Cl.
USPC ........ 704/270.1; 704/231; 704/234; 704/270; 704/275; 379/88.01; 379/88.16

(58) Field of Classification Search
CPC .. H04M 3/4936; H04M 3/4938; G10L 13/00; G10L 13/043; G10L 13/047; G10L 15/00; G10L 15/26; G10L 15/265; G10L 15/30; G10L 15/32; G10L 15/34
USPC .......... 704/270, 270.1, 275; 379/88.01, 88.16
See application file for complete search history.

(56) References Cited

U.S. PATENT DOCUMENTS

| | | | | |
|---|---|---|---|---|
| 6,785,653 | B1 * | 8/2004 | White et al. ................ | 704/270.1 |
| 6,801,604 | B2 * | 10/2004 | Maes et al. ................. | 379/88.17 |
| 7,003,463 | B1 * | 2/2006 | Maes et al. ................. | 704/270.1 |
| 7,099,442 | B2 * | 8/2006 | Da Palma et al. .......... | 379/88.22 |
| 7,174,297 | B2 * | 2/2007 | Guerra et al. ............... | 704/270.1 |
| 7,308,083 | B2 * | 12/2007 | Bettis et al. ................ | 379/88.17 |
| 7,412,038 | B2 * | 8/2008 | Creamer et al. ............ | 379/88.13 |
| 7,698,435 | B1 * | 4/2010 | Paterik et al. ................ | 709/227 |
| 7,715,547 | B2 * | 5/2010 | Ibbotson et al. ......... | 379/265.02 |
| 8,032,383 | B1 * | 10/2011 | Bhardwaj et al. ............ | 704/275 |
| 2002/0095473 | A1 * | 7/2002 | Berkowitz et al. ........... | 709/217 |
| 2003/0187658 | A1 * | 10/2003 | Selin et al. ................. | 704/270.1 |
| 2003/0225825 | A1 * | 12/2003 | Healey et al. ................ | 709/203 |
| 2004/0071275 | A1 * | 4/2004 | Bowater et al. ............ | 379/88.18 |
| 2004/0117804 | A1 * | 6/2004 | Scahill et al. ................ | 719/320 |
| 2005/0234727 | A1 * | 10/2005 | Chiu ........................ | 704/270.1 |
| 2006/0098792 | A1 * | 5/2006 | Frank et al. .................... | 379/70 |
| 2006/0177023 | A1 * | 8/2006 | Vaghar et al. .............. | 379/88.17 |
| 2007/0027692 | A1 * | 2/2007 | Sharma et al. ............. | 704/270.1 |
| 2007/0150902 | A1 * | 6/2007 | Meyer et al. ................. | 719/313 |
| 2008/0154593 | A1 * | 6/2008 | Da Palma et al. ............ | 704/235 |

* cited by examiner

*Primary Examiner* — Paras D Shah

(57) ABSTRACT

A system and method for facilitating user interaction with a voice application. A VoiceXML browser runs locally on a mobile device. Supporting components, such as a Resource Manager, a Call Data Manager, and a MRCP Gateway Client support operation of the VoiceXML browser. The Resource Manager servers either those files stored locally on the mobile device, or files accessible via a network connection using the wireless or mobile broadband capabilities of the mobile device. The Call Data Manager communicates call-specific data back to the application's system of origin or another configured target system. The MRCP Gateway Client provides the VoiceXML browser with access to media resources via a MRCP Gateway Client.

20 Claims, 6 Drawing Sheets

VOICEXML BROWSER AND SUPPORTING COMPONENTS FOR MOBILE DEVICES

BACKGROUND OF THE INVENTION

The present invention relates to a VoiceXML browser and supporting components for mobile devices. More particularly, the present invention is directed to a system and method for facilitating user interaction with voice applications using either locally stored applications or those accessible via the wireless or mobile broadband capabilities of a mobile device.

In telephony, Interactive Voice Response (IVR) is a technology that allows a computer to detect voice and touch tones in a telephone call.

Many companies employ systems based on IVR technology to process and route telephone calls originating from their respective customers. Examples include telephone banking, televoting, and credit card transactions. IVR systems are typically used to service high call volumes, reduce cost and improve the customer experience.

If a customer dials a telephone number that is answered by an IVR system, the system executes an application that responds to the customer/caller with pre-recorded or dynamically generated audio files. These audio files explain the options available to the caller and direct the caller on how to proceed. The caller selects an option by using spoken words or Dual-Tone Multi-Frequency (DMTF) tones, e.g., telephone keypad touch tones.

Modern IVR applications are structured similar to World Wide Web pages, using languages such as VoiceXML. Other languages may include, for example, SALT or T-XML.

Since many companies do not have their own IVR platforms, they typically turn to outsourcing companies or vendors to either host their VoiceXML application or manage the application as a whole. An example of such a hosted environment is shown in FIG. 1.

The hosted environment shown in FIG. 1 may include end user devices, such as a mobile device 105 or a land-line phone 110; hosted vendor systems 115; and client systems 120. The mobile device 105, such as a cellular phone, PDA, or iPhone, and/or the land-line phone 110 may communicate with the hosted vendor systems 115 via a telephony interface 125. The telephony interface 125, in turn, interacts with a VoiceXML browser 130, a MRCP TTS Server 135, and a MRCP Speech Recognition Server 140, all of which are part of the hosted vendor systems 115.

The VoiceXML browser 130 may be an extension of a web browser that presents an interactive voice user interface to the user and that operates on pages that specify voice dialogs. These pages may be written in VoiceXML language, which is the W3C's standard voice dialog markup language, but other proprietary voice dialog languages may be used. The VoiceXML browser 130 may present information aurally, using pre-recorded audio file playback or using Text-To-Speech (TTS) software to render textual information as audio. Further, the VoiceXML browser 130 may obtain information from the end user of the mobile device 105 and/or the land-line phone 110 by speech recognition and keypad entry, e.g., DTMF detection.

The VoiceXML browser 130 interacts with the MRCP TTS Server 135 and the MRCP Speech Recognition Server 140. MRCP stands for Media Resource Control Protocol, which is a communication protocol that allows speech servers to provide various speech services, such as speech recognition, speech synthesis, and TTS to its clients. The MRCP TTS Server 135 provides TTS services to its clients, and the MRCP Speech Recognition Server 140 provides speech recognition services to its clients.

Computer Telephone Integration (CTI) data are sent from the hosted vendor systems 115 to a CTI Management Server 145. CTI is a technology that allows interactions on a telephone and a computer to be integrated or coordinated. As contact channels have expanded from voice to email, web, and fax, CTI has expanded to include the integration of all customer contact channels (voice, email, web, fax, etc.) with computer systems. Common functions that may be implemented using CTI are, for example, call routing, call information display with or without using calling line data, phone control (answer, hang up, hold, conference, etc.), automatic dialing and computer-controlled dialing, etc.

Furthermore, application requests are sent from the VoiceXML Browser 130 to a VoiceXML Application Server 150, and the requested VoiceXML application is delivered from the VoiceXML Application Server 150 to the VoiceXML Server 130. The CTI Management Server 145 and the VoiceXML Application Server 150 are both part of the client systems 120.

More and more people use intelligent mobile devices, such as cellular phones, PDAs, or iPhones, as a means of communication. These intelligent mobile devices become more and more sophisticated due to, for example, increased computing power or memory capacity, and due to, for example, the availability of mobile Software Development Kits (SDKs), such as Java Platform, Micro Edition (Java ME) or Apple's iPhone SDK. This may lead to decreased reliance on teleservices companies that are built on standard telephony technology. More particularly, this may lead to decreased reliance on hosted environments for IVR applications, for example.

BRIEF SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a mobile device having a VoiceXML browser and supporting components. The VoiceXML browser runs locally on the mobile device, and the supporting components support the operation of the VoiceXML browser. The supporting components include a Resource Manager, a Call Data Manager, and a MRCP Gateway Client. The Resource Manager serves one of locally stored files and files accessible via a network connection utilizing at least one of the wireless and mobile broadband capabilities of the mobile device. The Call Data Manager communicates call-specific data to at least one of an application's system of origin and another configured target system. The MRCP Gateway Client provides the VoiceXML browser with access to media resources via a MRCP Gateway Server.

In another aspect, the present invention is directed to a method for facilitating user interaction with a voice application, wherein a VoiceXML browser runs locally on a mobile device, and wherein supporting components support the operation of the VoiceXML browser. The supporting components may include a Resource Manager, a Call Data Manager, and a MRCP Gateway Client. Locally stored files or files accessible via a network connection utilizing at least one of the wireless and the mobile broadband capabilities of the mobile device are served, and call-specific data to at least one of an application's system of origin and another configured target system are communicated. Access to media resources is provided to the VoiceXML browser via a MRCP Gateway Server.

In yet another aspect, the present invention is directed to a computer-readable medium comprising instructions for facilitating user interaction with a voice application. The instructions are for operating a VoiceXML browser that runs locally on a mobile device. The operation of the VoiceXML browser is supported with supporting components which may include a Resource Manager, a Call Data Manager, and a MRCP Gateway Client. Locally stored files or files accessible via a network connection utilizing at least one of the wireless and mobile broadband capabilities of the mobile device are served, and call-specific data to at least one of an application's system of origin and another configured target system are communicated. The VoiceXML browser is provided with access to media resources via a MRCP Gateway Server.

The present invention may allow companies requiring only a basic, DTMF-only IVR application to host their VoiceXML application on their existing web infrastructure and provide users of mobile devices access to the same IVR functionality that would normally need to be provided by an outsourced vendor. Companies requiring more advanced features as part of their IVR application may still benefit from the present invention by moving the call handling and VoiceXML processing off of a hosted platform and only using an outsourced vendor to perform advanced features such as speech recognition, natural language, or text-to-speech. Alternatively, the present invention may allow companies to move both basic, DTMF-only IVR applications and IVR applications with advanced features off of the hosted platform to their existing web infrastructure.

BRIEF DESCRIPTION OF THE SEVERAL VIEWS OF THE DRAWING

In the following section, the invention will be described with reference to exemplary embodiments illustrated in the attached Figures, in which.

DETAILED DESCRIPTION OF THE INVENTION

Reference will now be made in detail to exemplary embodiments of the present invention, examples of which are illustrated in the accompanying drawings.

Given the rapidly increasing processing power of mobile devices and the availability of mobile SDKs, a hosted application browser of the related art, such as a hosted VoiceXML browser, may be moved directly to an end user's mobile device. In other words, an application browser, such as a VoiceXML browser, and other, associated components may be deployed as a mobile application and implemented on the mobile device to allow a VoiceXML application to be processed directly on the mobile device. This concept may also be known as Mobile Voice Self Service (MVSS).

MVSS may provide the benefit of reduced cost or, in the case of simple applications, no hosting cost to companies, for example. In addition, the end-user features that MVSS provides may allow applications to become more user-friendly.

Figure 1:
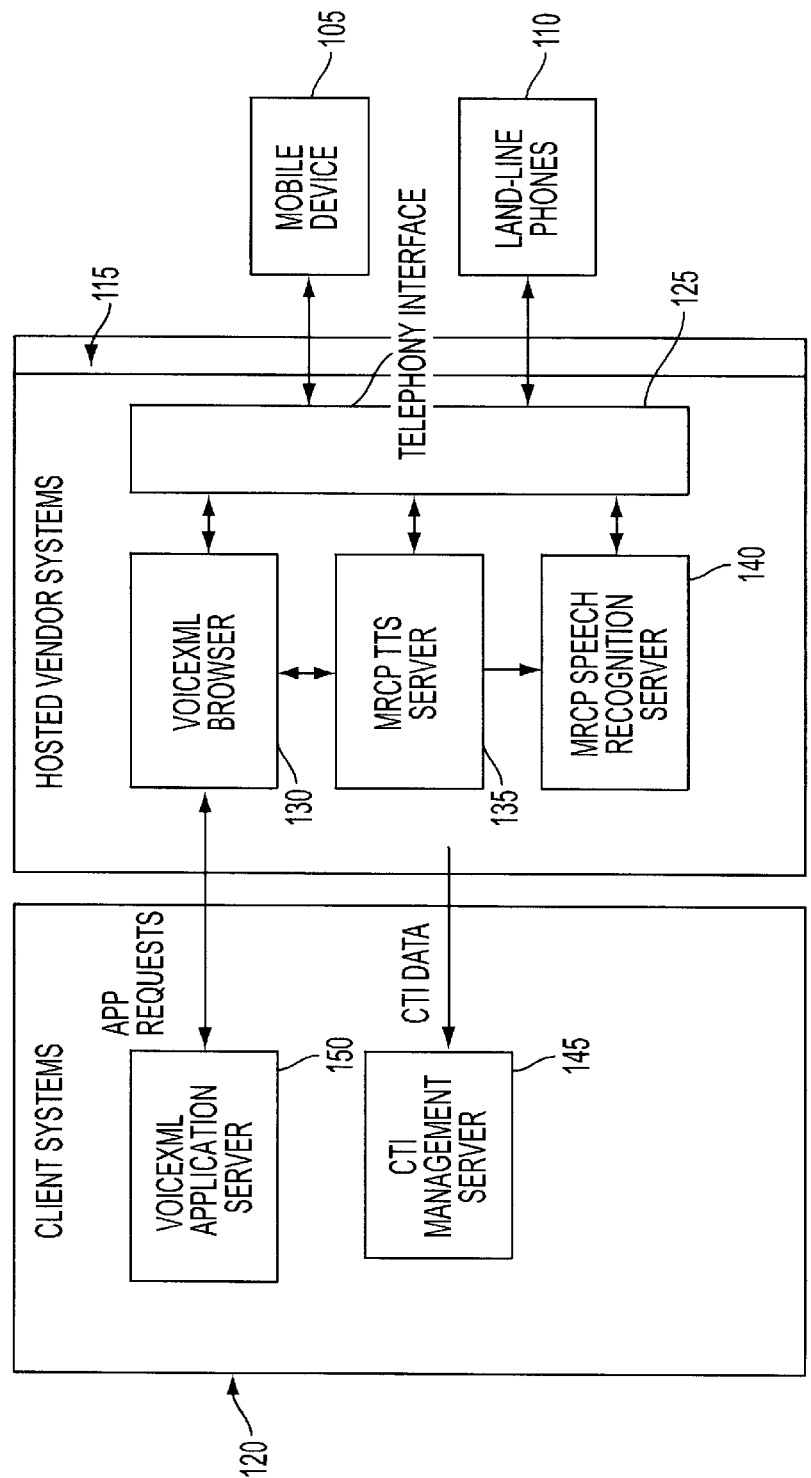
FIG. 1 illustrates a hosted environment for IVR applications as it may be known in the related art.
Figure 2:
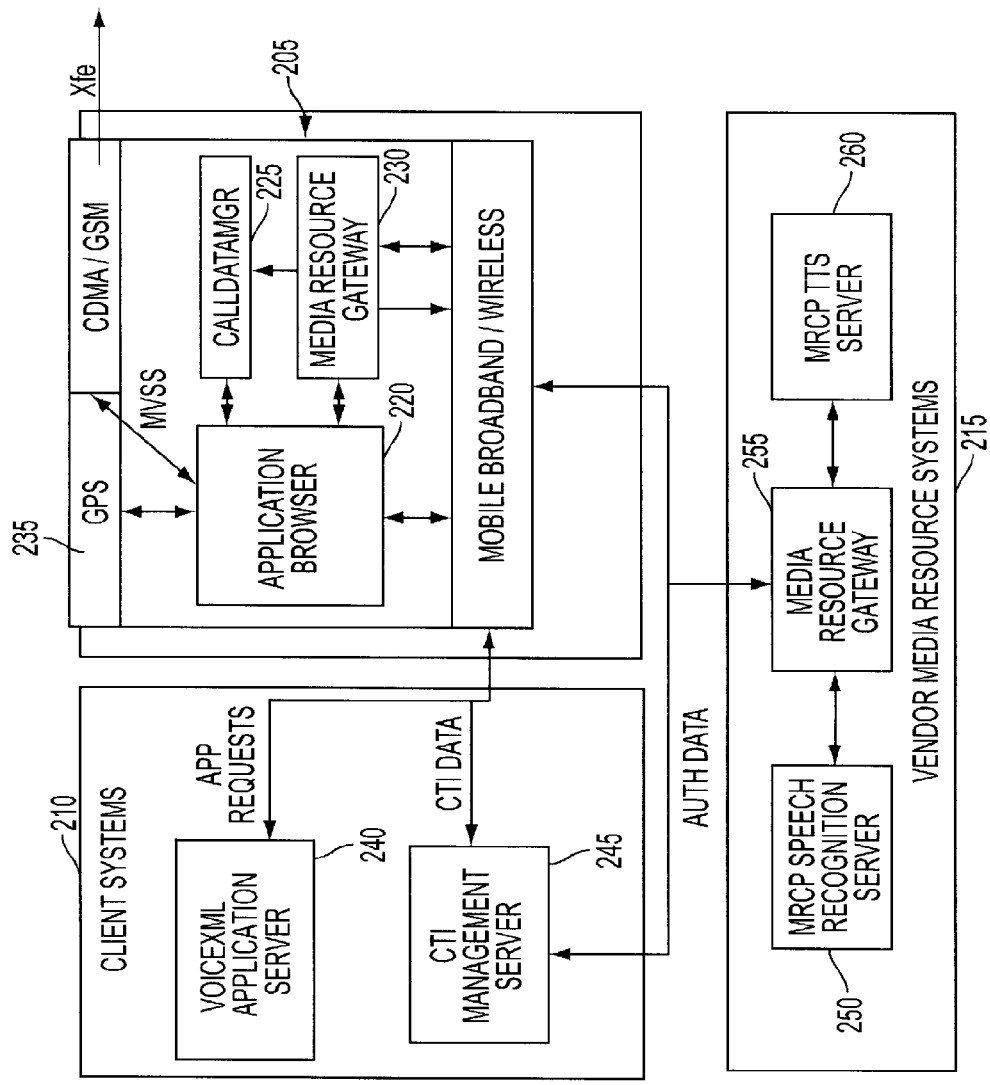
FIG. 2 illustrates a Mobile Voice Self Service (MVSS) system in accordance with an exemplary embodiment of the present invention.

FIG. 2 illustrates an MVSS system in accordance with an exemplary embodiment of the present invention.

As shown in FIG. 2, a mobile device 205 communicates with client systems 210 and media resource systems 215 of a vendor. The mobile device 205 may include an Application Browser 220 that interacts with a Call Data Manager 225 and a Media Resource Gateway 230. The Call Data Manager 225 and the Media Resource Gateway 230 may also be included in the mobile device 205. These components may utilize the mobile device's 205 mobile broadband or wireless connection to communicate with the client systems 210 or the service vendor's media resource systems 215. The mobile device 205 may be, for example, a cellular phone, a PDA, or an iPhone, and may operate, for example, in a CDMA or GSM network. The mobile device 205 may also include a GPS component 235 to provide, for example, location-based services to the user of the mobile device 205.

As is the case in the related art, the client systems 210 may include a VoiceXML Application Server 240 and a CTI Management Server 245. The vendor's media resources systems 215 may include an MRCP Speech Recognition Server 250, a Media Resource Gateway 255, and a MRCP TTS Server 260.

The Application Browser 220 of the mobile device 205 may be a VoiceXML 2.1 compliant browser with a minimal memory footprint and minimal processing overhead. Unlike the VoiceXML browsers used in a hosted environment in the related art, the Application Browser or VoiceXML browser 220 may only need to be able to handle one call. Therefore, the required processing power is significantly reduced. In addition, the VoiceXML browser 220 may be able to handle a majority of the call flow required to provide an IVR application to the user of the mobile device 205. The VoiceXML browser 220 may send application requests to the VoiceXML Application Server 240, and the requested VoiceXML application may be delivered from the VoiceXML Application Server 240 to the VoiceXML browser 220.

The Call Data Manager 225 may communicate important telephony events to the client systems 210, in particular to the CTI Management Server 245. Such telephony events may include, for example, set up, deliver (ringing), establish (answer), clear (hang up), end, hold, retrieve from hold, conference, transfer, forward, etc. When a legitimate call is being processed on the mobile device 205, the call data provided by the Call Data Manager 225 may be used, in conjunction with data of the VoiceXML Application Server 240, to authorize access to advanced MRCP features. The advanced MRCP features may include automatic speech recognition (ASR) that may be provided by the MRCP Speech Recognition Server 250 or Text-To-Speech (TTS) that may be provided by the MRCP TTS Server 260, for example. Proper authentication may be important because MRCP features may be charged per transaction by the vendor. Also, the Call Data Manager 225 may be important with respect to transfers. Transfers that usually depend on a carrier's advanced features may need to be implemented by other means, so it may be necessary for User-to-User Information (UUI) and other call data to be transferred out-of-band.

The Media Resource Gateway 255 may provide advanced services, such as ASR or TTS to the application, by bridging communication between the VoiceXML browser 220 and the MRCP services. As part of authorizing communication to media resources, MRCP requests from the VoiceXML browser 220 may be directed through the Media Resource Gateway 255. The gateway layer may handle authentication and then host the MRCP communication through the established channel. If the mobile device 205 is capable of processing speech or generating TTS on its own, resources not requiring vendor-specific handling may be passed off to the mobile device 205 by the Media Resource Gateway 230 thereby saving the application provider additional advanced service fees.

To facilitate the configuration of MVSS components prior to running a VoiceXML document, a Mobile Voice Self Service configuration file may be used. This file may be an xml-based configuration file that contains the configuration settings of the Media Resource Gateway 230 and the Call Data Manager 225 as well as the URL of the intended VoiceXML target.

Having a unique file type for voice applications targeted to mobile devices may also be useful in allowing seamless integration of MVSS into a web environment. A mobile device may automatically launch the MVSS application when the user follows a link that provides MVSS content. The format of such a file may be defined, published and validated via standard xml validation methods.

Simple blind transfers may be accomplished by allowing the MVSS application to access the phone's system APIs (Application Programming Interfaces) to simply dial the transfer number. More complicated transfers may require functions that may be unavailable within the realm of the mobile device's capabilities on the mobile carrier's network. To implement these transfers may require dialing a toll-free number that has carrier-advanced features and then utilizing CTI data to execute the transfer.

The following may be exemplary applications of MVSS that may be advantageous to, for example, the end users, vendors, service providers, companies and clients involved.

With respect to access to IVR applications, in the case of MVSS, the user may be allowed to access applications via web URLs rather than phone numbers. A client's site may list individual URLs for each subsection of their application, giving the user direct access to billing or technical support features, without the need for the client to have individual phone numbers for each service. Having direct access to the VoiceXML interpretation allows the user to easily "pause" the IVR, and it may be relatively simple to provide a complete range of controls a user would normally be accustomed to with other media, such as fast forward, rewind, etc.

Figure 3:
FIG. 3 illustrates an MVSS VoiceXML Navigation situation in accordance with an exemplary embodiment of the present invention.

Instead of having to rely on the application's menu repeat options, the user may interact with the browser instructing it to scan through a prompt in reverse, go back to the beginning of the current prompt or menu, or even go to a previous menu and either accept the user's original response again or provide new input. To support such features, when it comes to application reporting, it may be beneficial to create new VoiceXML events that the browser can handle, so reporting can accurately reflect the user's navigation. FIG. 3 shows an exemplary illustration of MVSS VoiceXML Navigation.

Having direct access to the call flow data may allow implementing user-defined hotkeys or "bookmarks" in a VoiceXML application. If the user would like to return to a portion of an application at a later time, he or she may press a hotkey capture button, which may then suspend the running VoiceXML application. The MVSS browser may store the current state and the input required to reach that state. After speaking or entering a bookmark identifier, the application may resume normally. At a later time, the user may request access to the bookmark, and this may instruct MVSS to load the application and automatically proceed to the bookmarked state if modifications to the applications do not prevent it. In the case where the application has been modified, MVSS may provide a message to the user indicating the bookmark needs to be updated; present the user with the prompt where the application changed; and wait for the user to indicate that he or she has once again reached the point in the application the user wishes to bookmark.

Location-based services is another area in which having the MVSS browser running directly on the mobile device may be of advantage. Providing location-based information to customers may mean to add more value in the mobile realm. Rather than relying on complicated data exchanges to determine the location of the caller, the browser may directly access the device's GPS or tower based coordinates and pass them on to the application server. This may all be done as part of the initial request to the application server. Self-service applications may then be catered for the caller's current location prior to even the first prompt.

Figure 4:
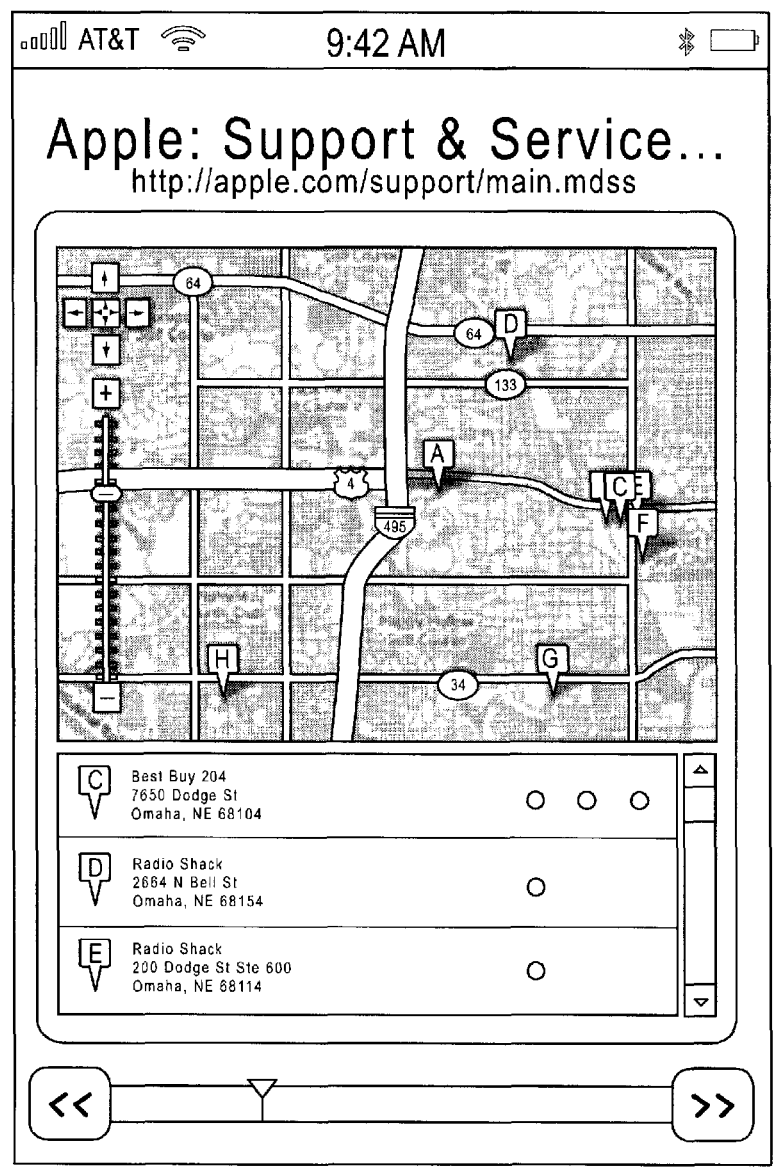
FIG. 4 illustrates incorporation of multimedia data into MVSS in accordance with an exemplary embodiment of the present invention.

Multimedia resources, as illustrated, for example, in FIG. 4, may be referenced within the VoiceXML application, allowing the mobile device to display supplemental data during the progress of the call. This may be utilized by providing an image of the caller's current billing statement when the caller requests payment information; by providing a video clip of the steps required to reset a satellite receiver when the caller is requesting technical support; or even by launching a web page with a registration form when the caller wants to enroll in some special program. There may also be the branding aspect that may be important to many companies, so a company logo, customer notifications, or advertising may be displayed on the mobile device while working with their IVR.

In the VoIP world, it may be common for a conference call to be presented along with video conferencing or a shared desktop for a presentation. MVSS may add functionality in the voice self-service world because the multimedia may also interact back with the IVR. For example, if the caller has a question about their bill, MVSS may display the caller's recent billing statement on the screen and allow the user to select the billing line-item the caller has a question about and say "What is this charge"? Again, due to the fact that the VoiceXML interpretation is happening locally on the caller's phone, the act of selecting an item on the screen may be passed to the browser as input without complex data exchanges. This sort of interaction may be simplified because MVSS is just a single system that accepts multiple forms of input.

MVSS technology may be an industry standard that may be implemented by mobile device builders as part of their devices' core features.

There may be several versions of MVSS to support various mobile device architectures. Open development environments like Java ME may aid in that sort of development, but each device may require its own special development for its unique features or hardware.

Figure 5:
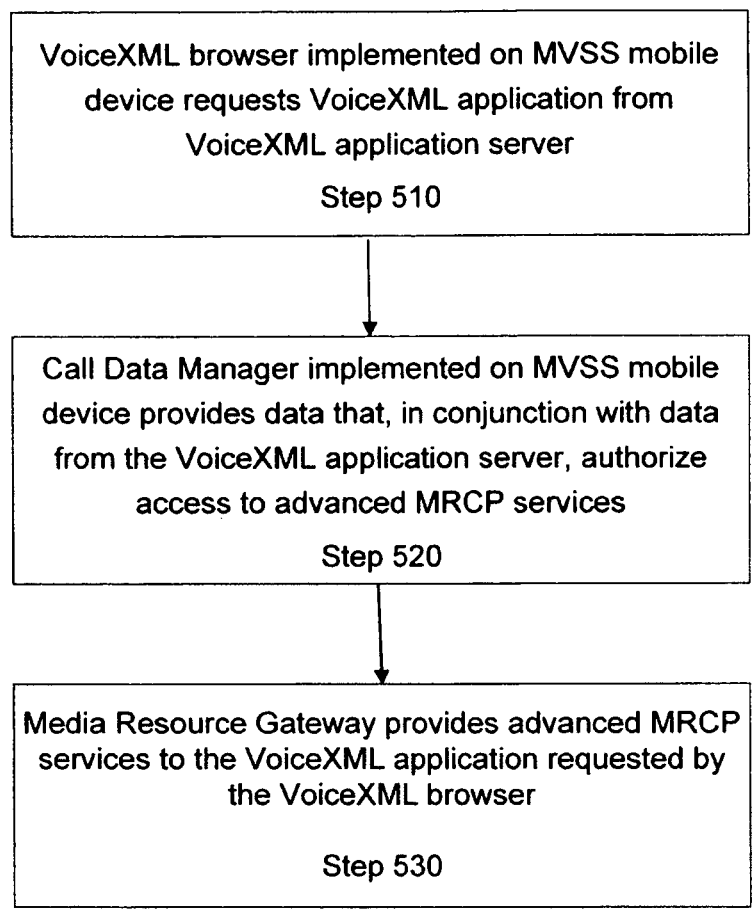
FIG. 5 illustrates a method in accordance with an exemplary embodiment of the present invention.

FIG. 5 illustrates a method in accordance with an exemplary embodiment of the present invention. In step 510, an application browser that is implemented on an MVSS mobile device may request an application from an application server. The application browser may be a VoiceXML browser; the application may be a VoiceXML application; and the application server may be a VoiceXML application server.

In step 520, a call data manager may provide call data. The call data manager may also be implemented on the MVSS mobile device. The call data, in conjunction with data from the application server, may authorize access to advanced MRCP services such as ASR or TTS.

In step 530, the advanced MRCP services may be provided to the application that was requested by the application browser. The advanced MRCP services may be provided by a media resource gateway.

In another exemplary embodiment of the present invention, a system and method are provided for facilitating user interaction with voice applications using either locally stored applications or those accessible via the wireless or mobile broadband capabilities of a mobile device.

Figure 6:
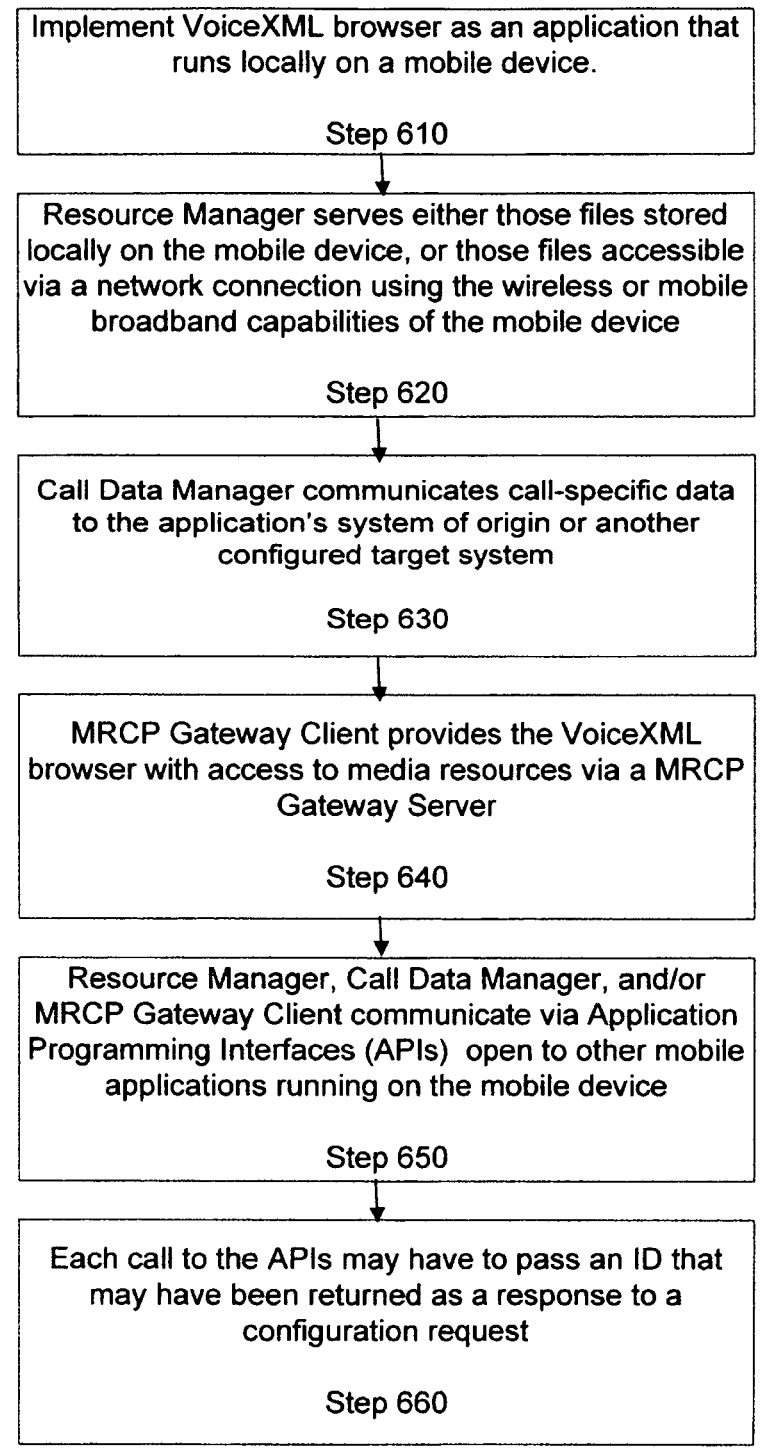
FIG. 6 illustrates a method in accordance with another exemplary embodiment of the present invention.

Therein, as shown in FIG. 6, a VoiceXML browser, which may be fully compliant with current VoiceXML specifications, may be implemented 610 as an application that runs locally on a mobile device. In addition, a Resource Manager may be provided that may be capable of serving 620 either those files stored locally on the mobile device, or those files accessible via a network connection using the wireless or mobile broadband capabilities of the mobile device. Further, a Call Data Manager may be provided to communicate 630 call-specific data back to the application's system of origin or another configured target system. An MRCP Gateway Client may also be implemented to provide 640 the VoiceXML browser with access to media resources via a MRCP Gateway Server.

The above-mentioned components may communicate 650 via Application Programming Interfaces (APIs) that may be open to other mobile applications running on the mobile device. Each call to the APIs may have to pass 660 an ID that may have been returned as a response to a configuration request. This may allow multiple applications to utilize the components concurrently and may prevent applications from utilizing resources that may be reserved for another application.

Furthermore, an MVSS configuration file may be used to launch a standard voice application on the above-mentioned components. The configuration file may define session data and credentials for accessing remote resources, component configurations, and the initial application Universal Resource Identifier (URI). An MVSS bootstrap application may read the configuration file, may configure the above-mentioned components, and may launch the application.

The VoiceXML browser may be capable of suspending and resuming execution of the VoiceXML application. These events may be initiated either by the user, the mobile device, or by calls to the browser's APIs.

The VoiceXML browser may also be capable of displaying alternative text and user responses for the voice application on-screen as a log of the user's interaction with the application. The user may navigate back to previous prompts and may optionally change a previous response by selecting the entry for that prompt and resuming the execution of the application from that point.

The VoiceXML browser may further be capable of displaying VoiceXML menu tags from the voice application as an on-screen graphical menu. The VoiceXML browser may report status and application information to other components or applications on the mobile device. This may enable the use of alternative user interfaces or other extensions to the browser.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A mobile device, comprising:
    a VoiceXML browser executing locally on the mobile device;
    components supporting the VoiceXML browser, the components resident and executing on the mobile device and comprising:
        a Resource Manager operable to serve one of locally stored files and files accessible via a network connection utilizing at least one of wireless and mobile broadband capabilities of the mobile device,
        a Call Data Manager operable to communicate call-specific data to at least one of an application's system of origin and another configured target system,
        a MRCP Gateway Client operable to provide the VoiceXML browser with access to media resources via a MRCP Gateway Server; and
    a mobile voice self service (MVSS) bootstrap application and an XML-based MVSS configuration file, both resident and executing on the mobile device and both separate from the VoiceXML browser, wherein the bootstrap application reads the configuration file to configure at least one of the supporting components and launch a voice application on at least one of the components wherein the configuration file contains configuration settings for the supporting components, defines session data and credentials for the voice application accessing remote resources, and provides an initial URI to access the voice application.

2. The mobile device as claimed in claim 1, wherein the mobile device launches an MVSS application when a user of the mobile device follows a link that provides MVSS content.

3. The mobile device as claimed in claim 1, wherein at least one of the supporting components is operable to communicate via Application Programming Interfaces (APIs) open to other applications running on the mobile device and wherein a call to the APIs must pass an ID that was returned as a response to a configuration request.

4. The mobile device as claimed in claim 1, wherein MVSS enables a VoiceXML browser to be deployed as a mobile application and implemented on the mobile device, further enabling a VoiceXML application to be processed directly on the mobile device.

5. The mobile device as claimed in claim 1, wherein mobile device is a mobile telephone.

6. The mobile device as claimed in claim 1, wherein the mobile device further provides access to call flow data, enabling user-define bookmarks in a VoiceXML application.

7. The mobile device as claimed in claim 1, wherein the VoiceXML browser is operable to at least one of suspend and resume execution of a VoiceXML application.

8. The mobile device as claimed in claim 7, wherein at least one of the mobile device, a user of the mobile device, and a call to Application Programming Interfaces (APIs) of the VoiceXML browser initiates the at least one of suspending and resuming of the VoiceXML application.

9. The mobile device as claimed in claim 1, wherein the VoiceXML browser is operable to display alternative text and user responses for a voice application on-screen as a log of the user's interaction with the voice application.

10. The mobile device as claimed in claim 1, wherein the VoiceXML browser is operable to display VoiceXML menu tags from a voice application as an on-screen graphical menu.

11. The mobile device as claimed in claim 1, wherein the VoiceXML browser is operable to report status and application information to at least one of other components and applications on the mobile device.

12. A method for facilitating user interaction with a voice application, comprising:

operating a VoiceXML browser executing locally on a mobile device;

supporting operation of the VoiceXML browser with supporting components selected from the group consisting of a Resource Manager, a Call Data Manager, and a MRCP Gateway Client, the supporting components resident and executing on the mobile device;

serving one of locally stored files and files accessible via a network connection utilizing at least one of wireless and mobile broadband capabilities of the mobile device;

communicating call-specific data to at least one of an application's system of origin and another configured target system;

providing the VoiceXML browser with access to media resources via a MRCP Gateway Server; and executing a mobile voice self service (MVSS) bootstrap application and an MVSS configuration file resident on the mobile device wherein the bootstrap application reads the configuration file to configure at least one of the supporting components and launch a voice application on at least one of the components wherein the configuration file contains configuration settings for the supporting components, defines session data and credentials for the voice application accessing remote resources, and provides an initial URI to access the voice application.

13. The method as claimed in claim 12, further comprising launching an MVSS application when a user of the mobile device follows a link that provides MVSS content.

14. The method as claimed in claim 12, further comprising at least one of the supporting components being operable to communicate via Application Programming Interfaces (APIs) open to other applications running on the mobile device wherein when a call to the APIs is made, passing an ID that was returned as a response to a configuration request.

15. The method as claimed in claim 12, further providing direct access to call flow data, enabling user-defined bookmarks via a VoiceXML application.

16. The method as claimed in claim 12, further comprising initiating at least one of suspending and resuming execution of a VoiceXML application via at least one of the mobile device, a user of the mobile device, and a call to Application Programming Interfaces (APIs) of the VoiceXML browser.

17. The method as claimed in 12, further comprising displaying alternative text and user responses for the voice application on-screen as a log of the user interaction with the voice application.

18. The method as claimed in claim 12, further comprising displaying VoiceXML menu tags from the voice application as an on-screen graphical menu.

19. The method as claimed in claim 12, further comprising reporting status and application information to at least one of other components and applications on the mobile device.

20. A non-transitory machine readable storage medium comprising instructions for facilitating user interaction with a voice application, the instructions for:

operating a VoiceXML browser executing locally on a mobile device;

supporting operation of the VoiceXML browser with supporting components selected from the group consisting of a Resource Manager, a Call Data Manager, and a MRCP Gateway Client wherein the supporting components reside on the mobile device;

serving one of locally stored files and files accessible via a network connection utilizing at least one of wireless and mobile broadband capabilities of the mobile device;

communicating call-specific data to at least one of an application's system of origin and another configured target system;

providing the VoiceXML browser with access to media resources via a MRCP Gateway Server and executing a mobile voice self service (MVSS) bootstrap application and an MVSS configuration file resident on the mobile device wherein the bootstrap application reads the configuration file to configure at least one of the supporting components and launch a voice application on at least one of the components wherein the configuration file contains configuration settings for the supporting components, defines session data and credentials for the voice application accessing remote resources, and provides an initial URI to access the voice application.

* * * * *